J. M. WILSON.
ANIMAL MARKER.
APPLICATION FILED NOV. 24, 1916.
1,318,821.
Patented Oct. 14, 1919.
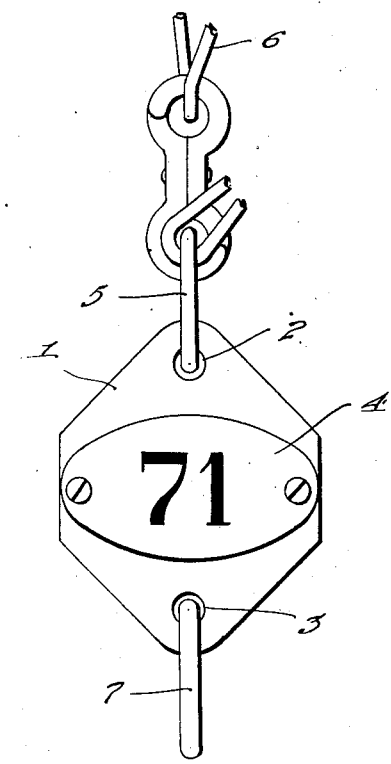
Jess M. Wilson,
Inventor
By Geo. P. Kimmel,
Attorney

UNITED STATES PATENT OFFICE.

JESS M. WILSON, OF STANBERRY, MISSOURI.

ANIMAL-MARKER.

1,318,821.   Specification of Letters Patent.   Patented Oct. 14, 1919.

Application filed November 24, 1916. Serial No. 133,167.

*To all whom it may concern:*

Be it known that I, JESS M. WILSON, a citizen of the United States, residing at Stanberry, in the county of Gentry and State of Missouri, have invented certain new and useful Improvements in Animal-Markers, of which the following is a specification.

The present invention relates to new and useful improvements in animal markers, and has particular reference to a designating means adapted to be attached to a chain or other fastening means secured about the neck of an animal.

The primary object of my invention is to provide a simple, inexpensive and efficient designating device of the class described having a numeral, name or other identification mark which will show the number of the animal or the particular species to which the animal belongs.

Another object of my invention is to provide an animal marker which is adapted for detachable association with a halter or other flexible element engaged about the neck of an animal.

Other objects and advantages to be derived from the use of my improved animal marker will appear from the following detail description and the claims, taken with an inspection of the accompanying drawings, in which;

Figure 1 is a perspective view of a cow's head with my invention applied.

Fig. 2 is an enlarged plan view of my marker.

Referring more particularly to the drawings, wherein similar characters of reference designate like and corresponding parts throughout the various views, in which a metallic hexagon plate 1 having openings 2 and 3 in opposite points thereon for a purpose which will hereinafter appear.

The animal marker means of my invention comprises a designating oval shaped plate 4, the ends of which terminate adjacent the outer free ends of the base plate 1.

It is of course to be understood that I may provide a similar plate on the opposite side of the base plate with the same or other designating means thereon, both plates having a common fastening means.

A link 5 is engaged in the opening 2 to provide a connecting means with a halter 6 or other similar flexible animal neck engaging device. A second link 6 is provided in the other opening designated 3 for attaching a lead chain or a restraining device.

From the above description taken in connection with the accompanying drawing, it is thought that a clear and comprehensive understanding of the construction, operation and advantages of my invention may be had, and while I have shown and described my animal marker embodying a specific structure, I desire that it be understood that I may make such changes in said structure as do not depart from the spirit and scope of the invention as claimed.

Having thus fully described my invention, what I claim as new and desire to secure by Letters Patent, is:—

1. In an animal marker, the combination of a metallic base plate having perforations in the opposite ends thereof, a designating plate detachably secured in rigid position on said base plate, a link member extending through one of said perforations for connection to a halter, and a second link member extending through the other perforation for engagement with a restraining device.

2. In an animal marker, the combination of a metallic base plate having perforations in the opposite ends thereof, a designating plate detachably secured in rigid position on said base plate, a link member extending through one of said perforations for connection to a halter, said second perforation adapted to engage a restraining device.

In testimony whereof I affix my signature hereto.

JESS M. WILSON.